(12) United States Patent
Ma

(10) Patent No.: US 9,375,667 B2
(45) Date of Patent: *Jun. 28, 2016

(54) APPARATUS AND METHOD FOR TREATING EXHAUST GAS

(71) Applicant: ArcelorMittal Investigacion y Desarrollo, S.L., Sestao (ES)

(72) Inventor: Naiyang Ma, Munster, IN (US)

(73) Assignee: ArcelorMittal Investigacion y Desarrollo, S.L. (ES)

(*) Notice: Subject to any disclaimer, the term of this patent is extended or adjusted under 35 U.S.C. 154(b) by 103 days.

This patent is subject to a terminal disclaimer.

(21) Appl. No.: 14/189,489

(22) Filed: Feb. 25, 2014

(65) Prior Publication Data

US 2014/0174299 A1 Jun. 26, 2014

Related U.S. Application Data

(63) Continuation of application No. 13/770,509, filed on Feb. 19, 2013, now Pat. No. 8,657,929, which is a continuation of application No. 12/713,773, filed on Feb. 26, 2010, now Pat. No. 8,377,175.

(51) Int. Cl.
*B01D 45/00* (2006.01)
*B01D 46/00* (2006.01)
(Continued)

(52) U.S. Cl.
CPC .......... *B01D 46/0023* (2013.01); *B01D 45/12* (2013.01); *B01D 46/02* (2013.01);
(Continued)

(58) Field of Classification Search
CPC .... B01D 46/0023; B01D 51/10; B01D 46/02; B01D 46/24; B01D 45/12; B01D 50/002; Y02W 30/54; C22B 7/02; C22B 19/28; Y10S 75/961; C04B 38/0006; C04B 41/009; C04B 35/565; C04B 41/508
USPC ........... 55/334, 315.1, 523, 361, 315; 95/268, 95/149, 230; 96/234, 360, 243, 301, 306, 96/355, 361, 364; 261/78.2
See application file for complete search history.

(56) References Cited

U.S. PATENT DOCUMENTS

| | | |
|---|---|---|
| 2,411,208 A | 11/1946 | Hall et al. |
| 2,771,158 A | 11/1956 | Bray et al. |

(Continued)

FOREIGN PATENT DOCUMENTS

| | | |
|---|---|---|
| DE | 1056157 B | 4/1959 |
| EP | 0626457 A1 | 11/1994 |

(Continued)

OTHER PUBLICATIONS

Ma, "On the Separation of Zinc from Dust in Ironmaking and Steelmaking Off-Gas Cleaning Systems", TMS (The Minerals, Metals & Materials Society), EPD Congress 2008, pp. 547-552.

(Continued)

*Primary Examiner* — Dung H Bui
(74) *Attorney, Agent, or Firm* — Berenato & White, LLC

(57) ABSTRACT

Presented is a method and apparatus for treating an exhaust gas. A series of filters and conditioning units are used to separate and extract various substances from the exhaust gas, typically originating from an industrial process. In an exemplary embodiment, a cyclone filter, a ceramic filter, a baghouse filter, and a pair of gas conditioners are used to initially separate and extract iron-rich dust from an exhaust gas and then extract zinc from the gas.

23 Claims, 2 Drawing Sheets

(51) Int. Cl.

| | | |
|---|---|---|
| *C04B 38/00* | (2006.01) | |
| *C04B 41/00* | (2006.01) | |
| *C04B 35/565* | (2006.01) | |
| *C04B 41/50* | (2006.01) | |
| *B01D 50/00* | (2006.01) | |
| *B01D 45/12* | (2006.01) | |
| *B01D 46/02* | (2006.01) | |
| *B01D 46/24* | (2006.01) | |
| *B01D 51/10* | (2006.01) | |
| *C22B 7/02* | (2006.01) | |
| *C22B 19/28* | (2006.01) | |
| *F01N 3/022* | (2006.01) | |

(52) U.S. Cl.
CPC ............ *B01D 46/24* (2013.01); *B01D 50/002* (2013.01); *B01D 51/10* (2013.01); *C04B 35/565* (2013.01); *C04B 38/0006* (2013.01); *C04B 41/009* (2013.01); *C04B 41/5089* (2013.01); *C22B 7/02* (2013.01); *C22B 19/28* (2013.01); *F01N 3/0222* (2013.01); *Y02W 30/54* (2015.05); *Y10S 75/961* (2013.01)

(56) References Cited

U.S. PATENT DOCUMENTS

| | | | |
|---|---|---|---|
| 2,771,344 A | 11/1956 | Michel et al. | |
| 2,966,232 A | 12/1960 | Austin | |
| 3,146,080 A | 8/1964 | Ruble et al. | |
| 4,283,223 A | 8/1981 | Billard | |
| 4,865,629 A | 9/1989 | Zievers et al. | |
| 4,878,943 A | 11/1989 | Kepplinger | |
| 5,032,143 A | 7/1991 | Ritakallio | |
| 5,108,496 A | 4/1992 | Gut et al. | |
| 5,162,107 A | 11/1992 | Hirsch et al. | |
| 5,181,943 A | 1/1993 | Weber | |
| 5,474,592 A | 12/1995 | Bresser et al. | |
| 5,567,225 A | 10/1996 | Bernard et al. | |
| 5,603,748 A | 2/1997 | Hirsch et al. | |
| 5,645,620 A | 7/1997 | Shenker | |
| 5,667,556 A | 9/1997 | Orth et al. | |
| 6,056,935 A | 5/2000 | Kai et al. | |
| 6,395,060 B1 | 5/2002 | Horne et al. | |
| 6,551,565 B2 | 4/2003 | Confuorto et al. | |
| 6,562,096 B1 | 5/2003 | Price et al. | |
| 6,716,404 B2 | 4/2004 | Masaki et al. | |
| 7,004,999 B2 | 2/2006 | Johnson et al. | |
| 7,749,311 B2 | 7/2010 | Saito et al. | |
| 7,854,908 B2 | 12/2010 | Hnat et al. | |
| 2001/0006613 A1 | 7/2001 | Masaki et al. | |
| 2002/0033098 A1 | 3/2002 | Hiltunen | |
| 2006/0144231 A1 | 7/2006 | Borley | |
| 2008/0092735 A1 | 4/2008 | Saito et al. | |
| 2008/0092739 A1 | 4/2008 | Saito et al. | |
| 2009/0139400 A1 | 6/2009 | Bach et al. | |
| 2009/0193968 A1 | 8/2009 | Jepsen et al. | |
| 2010/0263487 A1 | 10/2010 | Orth | |

FOREIGN PATENT DOCUMENTS

| | | |
|---|---|---|
| FR | 2093489 A5 | 1/1972 |
| JP | 03138312 A | 6/1991 |
| JP | 2002348605 A | 12/2002 |
| JP | 2005002426 A | 1/2005 |
| JP | 2005046815 A | 2/2005 |
| JP | 2005331172 A | 12/2005 |
| JP | 2008101826 A | 5/2008 |
| RU | 2068730 C1 | 11/1996 |
| RU | 2095128 C1 | 11/1997 |
| SU | 1139478 A1 | 2/1985 |
| WO | 2009/154088 A1 | 12/2009 |

OTHER PUBLICATIONS

Ma et al., "Role of an Axial Cyclone in Recycling of Blast Furnace Offgas Cleaning System Solid Wastes", Iron & Steel Technology, Mar. 2009, pp. 76-82, vol. 6, No. 3.

APPARATUS AND METHOD FOR TREATING EXHAUST GAS

CROSS-REFERENCE TO RELATED APPLICATIONS AND CLAIM TO PRIORITY

This application is a continuation of Ser. No. 13/770,509, filed Feb. 19, 2013, now U.S. Pat. No. 8,657,929, which is a continuation of application Ser. No. 12/713,773, filed Feb. 26, 2010, now U.S. Pat. No. 8,377,175, the disclosures of which are incorporated herein by reference and to which priority is claimed.

FIELD OF THE INVENTION

The invention is directed to the treatment of exhaust gases. More specifically, the invention is directed to the separation and/or removal of dust from exhaust gases and to the production of recyclable solid by-products in a basic oxygen furnace off-gas cleaning system.

BACKGROUND

Exhaust gasses are a by-product of many industrial processes and may contain a variety of substances such as lead, cadmium, zinc, iron, and/or dioxins. Many of these substances are considered harmful to the environment and need to be cleaned before an exhaust gas may be safely vented to the atmosphere. These substances, though harmful to the environment, may be reused as raw materials as long as their concentrations in the collected solid wastes are sufficiently high. When removed from the exhaust gas, and, in the same time, separated from each other, these substances may find economic use in the originating process or at an outside facility. Therefore, the efficient treatment of exhaust gases and separation of useful substances in the process has important environmental and financial implications.

For example, the process for steel-making using a basic oxygen furnace will create an off-gas containing a number of components, including iron and zinc. After scrap steel is charged into a basic oxygen furnace, molten iron from a blast furnace is poured into the furnace, and high quality oxygen is injected into the furnace, typically using a water-cooled oxygen lance. The introduction of oxygen at high speeds causes oxidation of carbon, other impurities, and some iron in the mixture, resulting in heat production and rapid mixing. In the process of blowing oxygen, some additive materials, like flux and alloy, are added into the furnace. The scrap steel often contains zinc, which can easily evaporate in the steelmaking process. Because of the strong turbulence and the high temperatures associated with making steel, 10-30 kg dust per ton liquid steel can be generated from ejection of liquid slag and molten iron, vaporization of evaporable components like zinc and lead, and entrainment of additive materials. The dust is carried out with the exhaust gas.

Previous methods of treating such gases have not considered to make the exhaust gas solid wastes recyclable in the gas cleaning process. Often the exhaust gas is treated by wet scrubbers, or initially treated by gravity dust catchers and then electrostatic precipitators. This generates a mixture of dust or a sludge which often contains zinc. The zinc level in the dust or sludge is often too high to reuse in an iron or steel-making process but too low to economically treat at a zinc recovery facility. Consequently, the dust or sludge is often disposed to landfills, or occasionally recycled using a subsequent process at great expense. These subsequent processes typically mix the dust or sludge with carbon or a carbon containing substance to form a mixture which is turned into pellets or briquettes. This mixture is subsequently processed using a number of different steps, such as heating, melting, volatilization, and reoxidization, to separate out various substances.

These prior methods, however, suffer from a number of drawbacks. Disposal of the non-recyclable solid wastes is increasingly costly and may be not allowable. Combining the solid wastes with carbon or a carbon material adds expense and additional processing steps, both to form the mixture and then to separate the initial substances back out. The heating, melting, and/or volatilization of these mixtures require a large amount of heat input, resulting in additional expense, wasted resources, and further pollution. Additionally, these types of processes, as well as other methods, may not effectively remove all of the harmful substances from the exhaust gas. Prior methods are also ineffective at properly isolating and separating useful substances.

SUMMARY

In an exemplary embodiment, the invention is directed to an apparatus used in the treatment of exhaust gases. The device comprises a first gas conditioner, a cyclone filter, a ceramic filter, a second gas conditioner, and a baghouse filter. The first gas conditioner initially conditions the exhaust gas. The cyclone filter and ceramic filter are designed and configured to remove dust from the exhaust gas. The second gas conditioner conditions the half-cleaned exhaust gas. The baghouse filter is designed and configured to remove a desired substance from the exhaust gas.

In another exemplary embodiment, the present invention is directed to an apparatus for the treatment of exhaust gases where the exhaust gas comprises dust and zinc. The apparatus comprises a first gas conditioner, a cyclone filter, a ceramic filter, a second gas conditioner, and a baghouse filter. The first gas conditioner initially conditions the exhaust gas. The cyclone filter and ceramic filter are both capable of removing dust from the exhaust gas without causing zinc condensation. The second gas conditioner is used to condition the exhaust gas a second time. Finally, the device utilizes a baghouse filter capable of removing zinc and remaining dust from the exhaust gas.

In another exemplary embodiment, the present invention is directed to a method of treating an exhaust gas. The method comprises first conditioning the exhaust gas. The gas is then communicated to a cyclone filter. The gas is then introduced from the cyclone filter to a ceramic filter. The gas then undergoes a second conditioning step before being introduced to a baghouse filter.

In another exemplary embodiment, the present invention is directed to a method of treating an exhaust gas. The method comprises first receiving an exhaust gas containing dust and zinc. The exhaust gas is conditioned a first time. Next, the exhaust gas is filtered to remove up to 50% by weight of the initial dust. The exhaust gas is then filtered a second time to remove up to 90% by weight of the dust remaining after the first filtering step. The exhaust gas is then conditioned a second time. Finally, the exhaust gas is filtered to remove zinc and remaining solids.

In another exemplary embodiment, the present invention is directed to a method of treating an exhaust gas. The method comprises, receiving an exhaust gas containing zinc. The exhaust gas is conditioned to achieve a desired initial temperature. Next, the exhaust gas is introduced to a cyclone filter which removes a first amount of a substance from the gas without causing zinc condensation. The gas is then communicated to a ceramic filter which removes a second amount of a substance from the gas without causing zinc condensation. The gas is then conditioned a second time, and finally communicated to a baghouse filter which removes zinc and remaining dust from the exhaust gas.

DETAILED DESCRIPTION OF EXEMPLARY EMBODIMENTS AND EXEMPLARY METHODS

Figure 1:
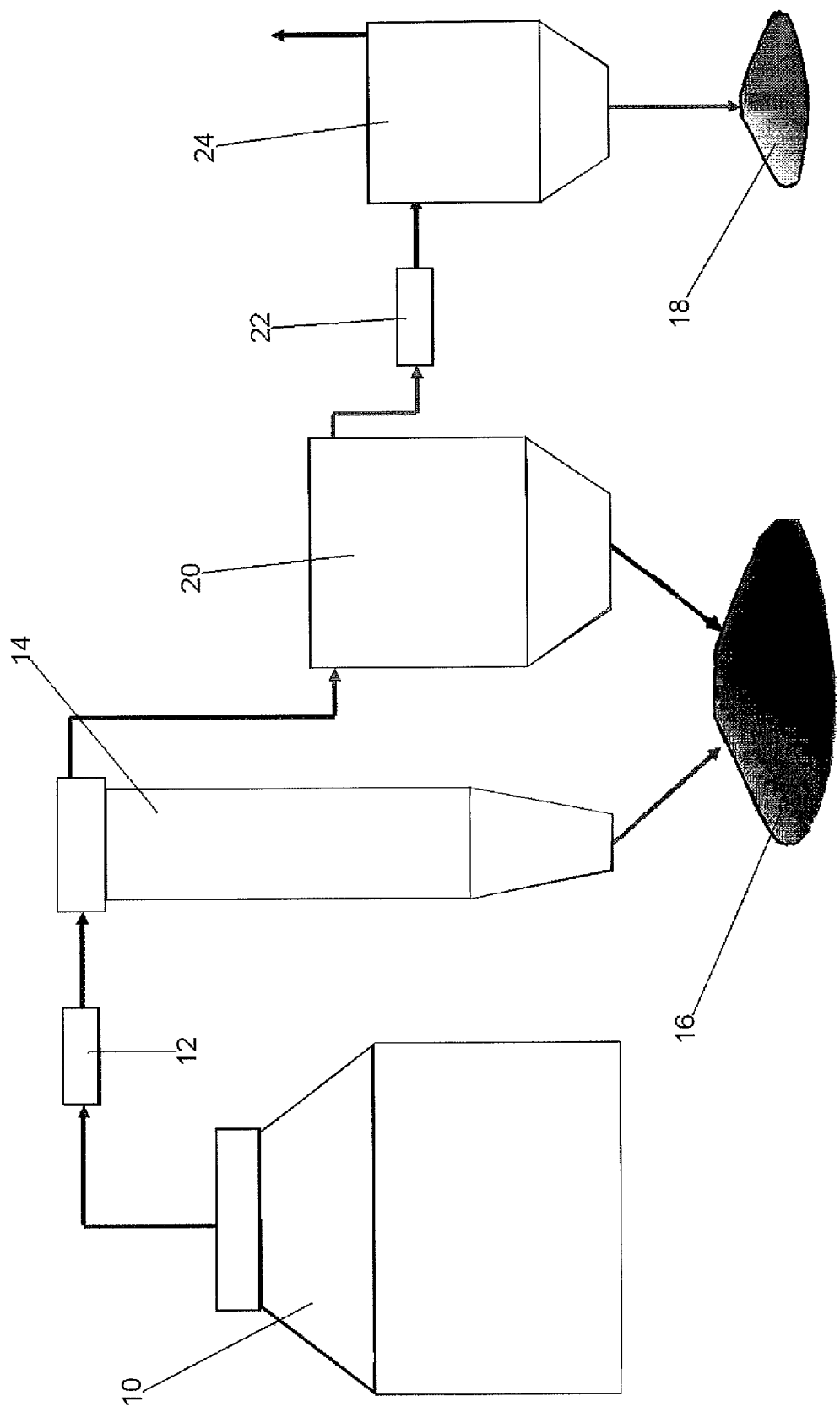
FIG. 1 is a schematic view of an exemplary exhaust gas treating apparatus.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods. Specifically, though the apparatus and method may be used to treat a variety of different gases from numerous sources, exemplary embodiments of the invention will be discussed in relation to the filtering of off-gas from a basic oxygen furnace.

Using the following described apparatus and methods, substances may be separated and removed from an exhaust gas in an efficient manner. The apparatus and method described below minimize the number of devices and steps needed to effectively treat exhaust gases and reclaim valuable substances. This is especially important to maximize the value of by-products to be sold for use by an outside facility. Additionally, while prior methods and devices have been directed to off-line treatment of exhaust gas solid wastes, the disclosed invention regards an on-line process which utilizes surplus thermal energy and kinetic energy of an industrial process to assist in the treatment of the exhaust gas solid wastes.

Initially, the exhaust gas is received from an industrial process 10, for example, a basic oxygen furnace. The concentration of impurities present in the gas may vary, and for example, may be about 100 to 300 grams per cubic meter. In an exemplary embodiment, the gas is received directly from the industrial process 10, though it may undergo prior treatment or processing as necessary. When the gas is received, it enters a first conditioning unit 12. The conditioning unit 12 may perform a number of operations on the gas, for example, separation, flow adjustments, pressure adjustments, or temperature adjustments. When a temperature adjustment is involved, the gas may be heated or cooled depending upon the operating parameters of the subsequent treating devices and the initial temperature of the exhaust gas. The conditioning of the gas temperature may be accomplished using a variety of indirect or direct contact heat exchange devices. Some examples include tubular heat exchangers, plate heat exchangers, fluid heat exchangers, spray columns, and water atomizers. An exemplary embodiment of the present invention utilizes a water atomizer, such as the MicroMist™ system by EnvrioCare, to condition the exhaust gas, the specifications of which are hereby incorporated by reference. When utilizing a water atomizer, exhaust gas passes through a chamber containing spray nozzles. The nozzles direct water, which is in the form of atomized water droplets, throughout the chamber. This conditions the gas by adjusting the temperature and raising the moisture content. For example, the gas may be conditioned to about 1200 degrees Celsius as it passes through the conditioning unit 12. The gas, however, may be conditioned to different temperatures depending upon the subsequent devices.

After the initial treatment in the conditioning unit 12, the gas passes to a first filter 14. This filter 14 should be capable of removing a substance and/or particles, for example, an amount of dust, present in the exhaust gas. In an exemplary embodiment, when used in connection with basic oxygen furnace exhaust gas, the first filter 14 removes iron-rich dust 16 from the exhaust gas without causing condensation of zinc present in the gas. A number of different filters may be used to achieve the required aspects of the present invention.

One example of a filter capable of this is a cyclone filter. Cyclone filters come in a variety of suitable types having different operating parameters. An example of such is the Axial Cyclone filters available from Paul Wurth S.A., and hot cyclone filters available from Siemens VAI, the specifications of which are hereby incorporated by reference. Cyclone filters receive fluid through an angled inlet port in a housing which creates a cyclone effect, rotating the fluid around and through the inside of the housing. The fluid then turns upwards and exits through the top of the filter. The movement of the fluid uses inertia to separate heavier particles present in the exhaust gas.

In an exemplary embodiment, a hot cyclone filter is used. A hot cyclone filter may be lined with ceramic in order to handle high temperature gas. Additionally, an outside heat source may be used to adjust the internal temperature of the filter. These filters will keep the gas from cooling, and thus prevent a vaporized substance 18 present in the gas from condensing. This allows the hot cyclone filter to separate only dust 16 present in the exhaust gas. The geometry of the filter may be designed and optimized in accordance with the flow rate of the exhaust gas so that up to 50% by weight of the dust 16 present in the gas will be removed.

After exiting the first filter 14, the gas passes to a second filter 20. This filter 20 should also be capable of removing substances and/or particles from the exhaust gas, for example, dust 16 remaining in the gas after passing through the first filter 14. As with the first filter 14, this should be achieved without condensation of vaporized substances, such as zinc. In an exemplary embodiment, the second filter 20 is capable of removing almost all of the dust 16 remaining in the exhaust gas after it passes through the first filter 14. A number of different filters may be used to achieve the required aspects of the present invention.

One type of filter that may be used is a ceramic filter, such as those available under the designation Glosfume® and from Pall Corporation, the specifications of which are hereby incorporated by reference. Depending on the exhaust gas, other similar materials may be used for filter elements such as carbon filters also designed by the Pall Corporation, the specifications of which are hereby also incorporated by reference.

Ceramic filters use cartridges to remove particles present in a fluid as it passes through the filter housing. The ceramic filter include any number of cartridges, each having a filter passage which may have a variety of shapes, such as rectangular, square, or honeycomb. The cartridges can also be made from a variety of materials, including aluminum oxide, silica oxide, and silicon carbide. Ceramic filters can withstand a high operating temperature, so that the gas will not have to be cooled after exiting filter 14. Where the exhaust gas to be treated is from a basic oxygen furnace, the high temperature of the gas will prevent zinc condensation so that other substances may be effectively separated and filtered out. Because a portion of the dust 16 has already been removed by the previous filter, the ceramic filter removes up to 90% by weight of the dust 16 remaining in the exhaust gas. As an added benefit, the ceramic filter removes finer size particles present in the exhaust gas than may be removed by the cyclone filter.

After the exhaust gas has passed through the first and second filters 14, 20, a majority of the dust 16 contained in the gas will have been separated out. Depending on the exhaust gas, this dust 16 may be capable of use, either in the originating industrial process or in an outside facility. Therefore, the dust 16 may be collected from the first and second filters 14, 20 for reuse. Depending on the layout, the dust 16 from the first and second filters 14, 20 may empty into the same location or into separate locations. The dust 16 may then be collected and either reused by the facility or shipped to separate locations.

In an exemplary embodiment relating to the treatment of exhaust gas from a basic oxygen furnace, the dust 16 collected by the first and second filters 14, 20 will contain high amounts of iron. This iron-rich dust may be reused in the sintering plant, which will use the dust to supplement fine iron ore charged into the sintering mixture. Because the iron-rich dust has been separated out and is substantially free of zinc, it may be used directly in the sintering plant and then a blast furnace without further processing. This increases the efficiency of the steel-making process by lowering costs and allowing reuse of waste materials.

After passing through the second filter 20, the gas enters a second conditioning unit 22. As with the first conditioning unit 12, a variety of different operations may take place. For example, the gas may again be conditioned to adjust its temperature, being heated or cooled depending on the operating parameters of the subsequent treatment device. The conditioning of the gas temperature may be accomplished using a variety of indirect or direct contact heat exchange devices. Some examples include tubular heat exchangers, plate heat exchangers, fluid heat exchangers, spray columns, and water atomizers. The second conditioning unit 22 may be of the same type as the first conditioning unit 12. In an exemplary embodiment utilizing a water atomizer, exhaust gas will pass through a chamber containing a spray nozzle. This nozzle will direct water throughout the chamber to evenly condition the temperature of the gas.

After passing through the second conditioning unit 22, the exhaust gas passes through a third filter 24. This filter 24 is designed to remove substances that remain in the exhaust gas after passing through the previous processing steps. These substances may still be vaporized in the exhaust gas or may have condensed out as a result of conditioning unit 22. In an exemplary embodiment relating to the treatment of exhaust gas from a basic oxygen furnace, the third filter 24 removes zinc 18 present in the gas. The filter 24 may be of any conventional type suitable for this purpose.

In an exemplary embodiment, the third filter 24 will be a baghouse filter such as those produced by the Aircon Corporation, Ducon, or U.S. Air Filtration, Inc., the specifications of which are hereby incorporated by reference. Baghouse filters typically use a number of fabric bags which filter out particles as an exhaust gas passes through them. Cleaned air will exit through the top of the baghouse filter, while particles fall to the bottom. Different types of baghouse filters may be used, including reverse-air, reverse-jet, and mechanical shaker types. The bags used in the filter may be made from a variety of materials including woven or felted cotton, glass fibers, or synthetic materials. The material used will depend on a number of factors, including the temperature of the gas entering the filter, the size of the particles to be filtered, gas pressure, etc. Thus, the materials used in the baghouse filter must be taken into consideration when choosing a temperature to condition the gas in the prior conditioning step. In an exemplary embodiment, the baghouse filter may have an operating temperature in the range of 260 degrees Celsius.

After passing through the third filter 24, the treated exhaust gas may be vented to the atmosphere or undergo further processing depending on the characteristics and contents of the gas. The substance 18 filtered through the third filter 24 may be collected and reused, similar to the dust 16 collected from the first two filters 14, 20. In an exemplary embodiment relating to the treatment of exhaust gas from a basic oxygen furnace, as a result of the substances already removed by the previous filters 14, 20, the substance 18 separated by the third filter 24 may contain a high concentration of zinc. Because of the high concentration of zinc, this substance 18 is useful as a raw material. The collected zinc may be sold to other industries and used for a variety of purposes such as coatings, the production of alloys, and for use in other compounds.

Figure 2:
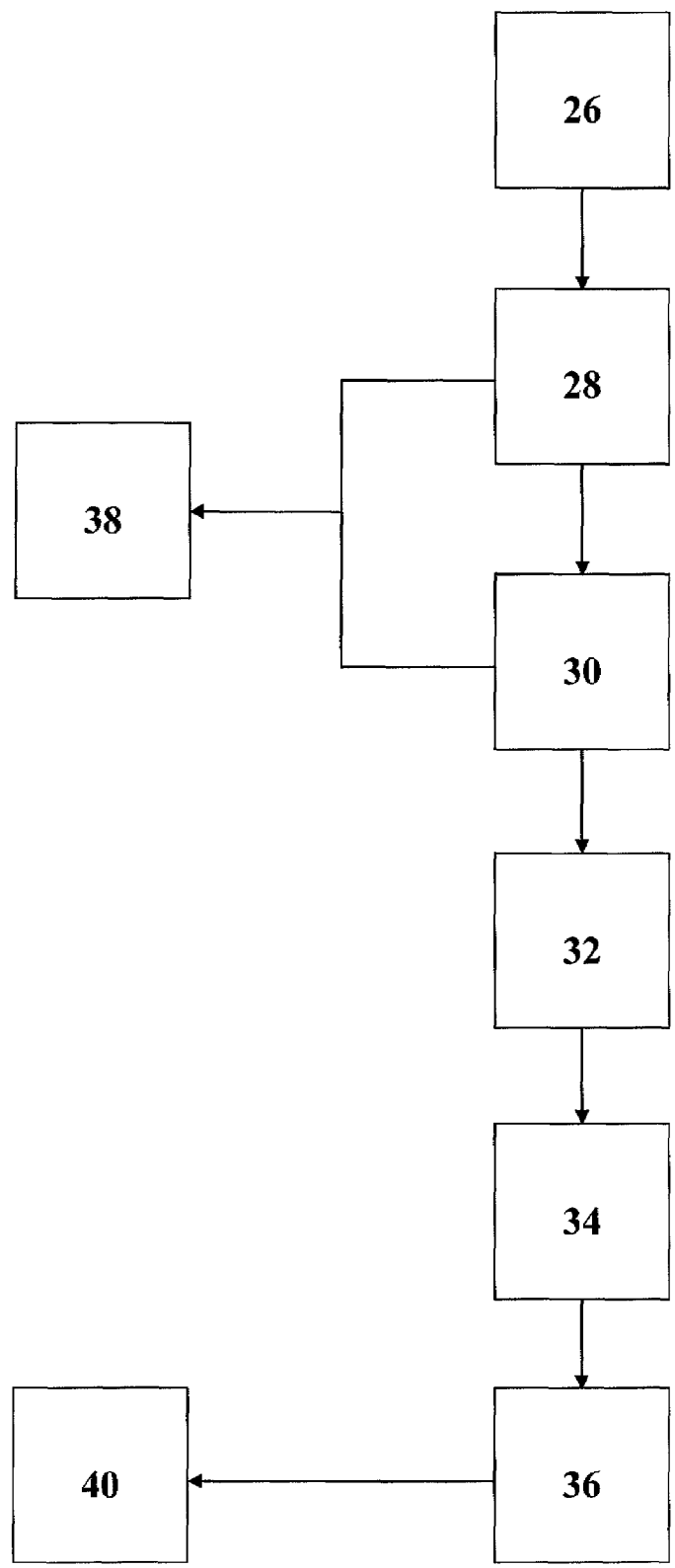
FIG. 2 is a flow chart depicting an exemplary method of treating an exhaust gas.

As best shown in FIG. 2, in addition to the apparatus and method described above, an exemplary embodiment of the invention is directed to a method for the treatment of an exhaust gas. Initially, the gas is received in a first step 26 from an industrial process and contains zinc and an iron-rich dust. The exhaust gas is then conditioned at step 28. This first conditioning step is performed by a heat exchanger, such as a water atomizer, and conditions the gas to a temperature of about 1200 degrees Celsius which is higher than the vaporization temperature of zinc. As a result, the zinc does not condense and remains vaporized. The gas then passes through a first filter 30 which removes a first amount of a substance, such as dust containing iron. The amount removed, for example, may be up to 50% by weight. The gas then passes through a second filter 32 which removes a second amount of a substance, such as a second amount of dust. The amount removed, for example, may be up to 90% by weight of the dust remaining in the exhaust gas. The gas then undergoes a second conditioning step 34. This step conditions the gas to achieve a second temperature, for example 260 degrees Celsius. This second conditioning step 34 is also be performed by a heat exchanger, such as a water atomizer. The gas then passes through a third filter 36 which removes another substance, such as zinc contained in the gas. In additional steps, the iron-rich dust separated by the first filtering step 30 and the second filtering step 32 may be collected in step 38. Similarly, the zinc separated by the third filtering step 36 may be collected in step 40.

Those skilled in the art will understand that in basic oxygen furnace (BOF) steelmaking, dust generation is between 10 and 30 kg per ton of liquid steel; gas generation is about 101 standard cubic meters per ton of liquid steel without considering gas combustion, air infiltration and water cooling; dust concentration in gas, if not considering gas combustion, air infiltration and water cooling, is about 100-300 g per standard cubic meter; zinc vapor in gas has a partial pressure $<1 \times 10^{-2}$ atm, mostly $\sim 1 \times 10^{-3}$ atm. A modern baghouse can operate for an extended period at 260° C. (500° F.) or more. The disclosed invention is able to operate under these conditions.

The foregoing description of the exemplary embodiments of the present invention has been presented for the purpose of illustration. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. For example, different devices and steps may be added to exemplary embodiments described above without departing from the scope of the invention. Moreover, features or components of one embodiment may be provided in another embodiment. Thus, the present invention is intended to cover all such modification and variations.

What is claimed:

1. An apparatus, comprising:
   a first gas conditioner designed to receive and condition an exhaust gas and creating a conditioned exhaust gas;
   a cyclone filter, in fluid communication with and downstream of said first gas conditioner, designed to remove dust from the conditioned exhaust gas;
   a ceramic filter, in fluid communication with and downstream of said cyclone filter, designed to remove additional dust from the conditioned exhaust gas;
   a second gas conditioner, in fluid communication with and downstream of said ceramic filter, designed to receive and further condition the conditioned exhaust gas, creating a further conditioned exhaust gas; and
   a filter, downstream of said second gas conditioner, designed to receive and filter the further conditioned exhaust gas to remove a substance from the further conditioned exhaust gas.

2. The apparatus of claim 1, wherein said filter downstream of said second gas conditioner comprises a baghouse filter.

3. The apparatus of claim 1, wherein said first and second gas conditioners comprise water atomizers.

4. The apparatus of claim 1, wherein said filter downstream of said second gas conditioner comprises a baghouse filter.

5. The apparatus of claim 1, wherein the exhaust gas contains iron-rich dust and zinc.

6. The apparatus of claim 1, wherein the dust comprises an iron-rich dust and wherein the substance comprises zinc.

7. The apparatus of claim 6, wherein said cyclone filter is configured to remove the iron-rich dust from the conditioned exhaust gas without condensation of the zinc.

8. The apparatus of claim 6, wherein said ceramic filter is configured to remove the iron-rich dust from the conditioned exhaust gas without condensation of the zinc.

9. The apparatus of claim 6, wherein said cyclone filter and said ceramic filter are each configured to remove the iron-rich dust from the conditioned exhaust gas without condensation of the zinc.

10. The apparatus of claim 6, further comprising a collector connected to said cyclone filter and said ceramic filter for collecting the iron-rich dust.

11. An apparatus for the treatment of exhaust gases from an industrial process, comprising:
    a first gas conditioner designed to receive and condition an exhaust gas and creating a conditioned exhaust gas;
    a first filter, in fluid communication with and downstream of said first gas conditioner, designed to remove dust from the conditioned exhaust gas;
    a ceramic second filter, in fluid communication with and downstream of said first filter, designed to remove additional dust from the conditioned exhaust gas;
    a second gas conditioner, in fluid communication with and downstream of said ceramic second filter, designed to receive and further condition the conditioned exhaust gas, creating a further conditioned exhaust gas; and
    a third filter, downstream of said second gas conditioner, configured to receive and filter the further conditioned exhaust gas to remove a substance from the further conditioned exhaust gas.

12. The apparatus of claim 11, wherein said third filter comprises a baghouse filter.

13. The apparatus of claim 11, wherein said first and second gas conditioners comprise water atomizers.

14. The apparatus of claim 11, wherein said third filter comprises a baghouse filter.

15. The apparatus of claim 11, wherein the dust comprises an iron-rich dust and wherein the substance comprises zinc.

16. The apparatus of claim 15, wherein said first filter is configured to remove the iron-rich dust from the conditioned exhaust gas without condensation of the zinc.

17. The apparatus of claim 15, wherein said ceramic second filter is configured to remove the iron-rich dust from the conditioned exhaust gas without condensation of the zinc.

18. The apparatus of claim 15, wherein said first filter and said ceramic second filter are each configured to remove the iron-rich dust from the conditioned exhaust gas without condensation of the zinc.

19. The apparatus of claim 15, further comprising a collector connected to said first filter and said ceramic second filter for collecting the iron-rich dust.

20. An apparatus for the treatment of exhaust gases from an industrial process, comprising:
    a first gas conditioner designed to receive and condition an exhaust gas containing iron-rich dust and zinc and creating a conditioned exhaust gas;
    a first filter, in fluid communication with and downstream of said first gas conditioner, designed to remove iron-rich dust from the conditioned exhaust gas, wherein the iron-rich dust removed by the first filter is substantially free of the zinc;
    a ceramic second filter, in fluid communication with and downstream of said first filter, designed to remove additional iron-rich dust from the conditioned exhaust gas, wherein the additional iron-rich dust removed by the ceramic second filter is substantially free of the zinc;
    a second gas conditioner, in fluid communication with and downstream of said ceramic second filter, designed to receive and further condition the conditioned exhaust gas, creating a further conditioned exhaust gas; and
    a third filter, downstream of said second gas conditioner, designed to receive and filter the further conditioned exhaust gas to remove the zinc from the further conditioned exhaust gas.

21. The apparatus of claim 20, wherein said first filter comprises a cyclone filter.

22. The apparatus of claim 20, wherein said third filter comprises a baghouse filter.

23. The apparatus of claim 20, wherein said first filter comprises a cyclone filter and said third filter comprises a baghouse filter.

* * * * *